(12) United States Patent  
Hemingway

(10) Patent No.: US 8,899,284 B2
(45) Date of Patent: Dec. 2, 2014

(54) FLUID RECEIVER HAVING REMOVABLE SLEEVE

(71) Applicant: Flomax International, Inc., Springville, UT (US)

(72) Inventor: Robert E. Hemingway, Springville, UT (US)

(73) Assignee: Flomax International, Inc., Springville, UT (US)

( * ) Notice: Subject to any disclaimer, the term of this patent is extended or adjusted under 35 U.S.C. 154(b) by 0 days.

(21) Appl. No.: 13/679,678

(22) Filed: Nov. 16, 2012

(65) Prior Publication Data

US 2013/0074977 A1    Mar. 28, 2013

Related U.S. Application Data

(63) Continuation of application No. 12/497,410, filed on Jul. 2, 2009, now Pat. No. 8,316,900.

(60) Provisional application No. 61/078,211, filed on Jul. 3, 2008.

(51) Int. Cl.
  *B65B 1/04* (2006.01)
  *B60K 15/04* (2006.01)
  *B65B 3/04* (2006.01)

(52) U.S. Cl.
  CPC .. *B65B 3/04* (2013.01); *B60K 15/04* (2013.01)
  USPC .......... 141/349; 141/353; 137/15.18; 137/511

(58) Field of Classification Search
  USPC ............. 141/231, 311 R, 347–349, 351, 353; 137/511, 15.18
  See application file for complete search history.

(56) References Cited

U.S. PATENT DOCUMENTS

| | | | |
|---|---|---|---|
| 2,630,822 A | 3/1953 | Davies | |
| 2,638,916 A | 5/1953 | Scheiwer | |
| 3,208,486 A | 9/1965 | Fromm | |
| 3,662,793 A | 5/1972 | Calisher et al. | |
| 3,674,061 A * | 7/1972 | Calisher et al. ............... | 141/198 |
| 3,850,191 A | 11/1974 | Brown | |
| 4,108,203 A * | 8/1978 | Brown ......................... | 137/496 |
| 4,499,932 A | 2/1985 | Perigo et al. | |
| 4,919,174 A | 4/1990 | Warland | |
| 6,168,168 B1 | 1/2001 | Brown | |
| 6,539,969 B1 | 4/2003 | Sullivan | |
| 6,622,760 B2 | 9/2003 | Peattie | |
| 6,705,550 B2 | 3/2004 | Bell | |
| 7,766,039 B2 * | 8/2010 | Zuck ........................ | 137/614.04 |
| 2007/0062603 A1 | 3/2007 | Mackey et al. | |

\* cited by examiner

*Primary Examiner* — Jason K Niesz
(74) *Attorney, Agent, or Firm* — Kunzler Law Group

(57) ABSTRACT

Described herein are several embodiments and implementations of a fluid receiver with a removable sleeve. According to one representative embodiment, an apparatus for receiving a fluid from a fluid source includes a base having an inlet and an outlet. The base defines an interior cavity through which fluid is flowable from the inlet to the outlet. The apparatus also includes a valve that is movable relative to the base between a closed and open position. In the closed position, the valve is in sealing engagement with the base to prevent fluid flow through the inlet. In the open position, the valve allows fluid flow through the inlet. The apparatus further includes a removable sleeve that is removably securable about a portion of the base. The valve remains in the closed position as the removable sleeve is removed from and secured about the base.

20 Claims, 7 Drawing Sheets

FLUID RECEIVER HAVING REMOVABLE SLEEVE

CROSS-REFERENCE TO RELATED APPLICATIONS

This application is a continuation application of U.S. patent application Ser. No. 12/497,410, filed Jul. 2, 2009, which claims the benefit of U.S. Provisional Patent Application No. 61/078,211, filed Jul. 3, 2008, both of which are incorporated herein by reference.

FIELD

This disclosure relates to fluid transfer devices, and more particularly to a fluid receiver for receiving fluid from a nozzle.

BACKGROUND

Fuel receivers for receiving fuel from a fuel source are commonly known in the art. Common applications include refueling large pieces of equipment, such as construction and mining vehicles, on-site using a mobile refueling source, such as a refueling truck. Generally, the fuel receivers are secured to the equipment in fuel providing communication with a fuel tank of the equipment. The fuel source includes a hose and a nozzle attached to an end of the hose. When fueling or refueling of the equipment is desired, the nozzle is placed securely over the receiver, a valve of the receiver is opened, and fuel is pumped from the fuel source, through the hose, nozzle, and receiver, to the fuel tank of the equipment. Such receiver and nozzle refueling systems are designed to facilitate efficient refueling events, that is, attachment of the nozzle, transmission of fuel into the fuel tank, and detachment of the nozzle.

Some equipment may require multiple refueling events in a single day. The continuous attachment and detachment of nozzles tends to wear down the features of the receivers configured to mate with the nozzles. As the nozzle mating features of the receivers wear down, the nozzles may not properly seal against the receivers, and fuel may leak due to the insecure connection between the receiver and nozzles. Therefore, the nozzle mating features of the receivers must be replaced periodically to reestablish a secure connection between the receiver and nozzles and to conserve fuel.

Some conventional fuel receivers require replacement of the entire receiver in order to replace the nozzle mating features. Replacement of the entire receiver generally involves suspending operation of the equipment for a significant amount of time while any fuel remaining in the fuel tank is drained, the receiver is removed from the equipment, and a new receiver is secured to the equipment. In the construction and mining industries, downtime resulting from inoperable equipment corresponds to lost time, profits, and added expense (e.g., $3,000 to $5,000 per hour per vehicle in the mining industry). Therefore, receivers requiring complete replacement to remove worn nozzle mating features have several drawbacks.

Other conventional receivers attempt to eliminate the need to completely remove the receiver for replacing nozzle mating features by removing just a nose portion of the receiver while keeping the base secured to the equipment. The nose portion is designed to have the nozzle mating features formed in an exterior surface of the nose portion. As with most conventional receivers, a valve or poppet is used to plug an inlet of the receiver in a closed position and open the inlet in an open position. Typically, the valve forms a seal with the nose portion of the receiver when in the closed position such that when the nose is removed to replace the nozzle mating features, the seal between the valve and the nose is broken. Therefore, these other conventional receivers included other devices to form a seal with the base, which remained attached to the equipment during removal of the nose. For example, one conventional receiver includes a second poppet that moves to form a seal between the second poppet and base when the nose is removed. In another conventional receiver, a check valve is positioned in the receiver that operates to allow fuel to flow in one direction but not in another.

These other conventional receivers suffer from several drawbacks. First, the second poppet and check valve are positioned at some location away from the main poppet such that an amount of fuel resides within the receiver between the main poppet and second poppet/check valve. When the nose is removed and the seal between the main poppet and nose is broken, the fuel between the main poppet and second poppet/check valve spills out of the receiver and is wasted. Second, the second poppet/check valve creates an obstruction to fuel flow that reduces the flow rate through the receiver. The obstruction causes turbulence in the flow, which creates backpressure. Because of the backpressure, more pumping work is required to move a given amount of fuel through the receiver. Third, the nose is typically a bulky and complex part, which can be expensive to manufacture and replace.

SUMMARY

The subject matter of the present application has been developed in response to the present state of the art, and in particular, in response to the problems and needs in the art that have not yet been fully solved by currently available fluid receivers. Accordingly, the subject matter of the present application has been developed to provide a fluid receiver with a removable sleeve that overcomes at least some shortcomings of the prior art aftertreatment systems. Described herein are several embodiments and implementations of a fluid receiver with a removable sleeve.

According to one representative embodiment, an apparatus for receiving a fluid from a fluid source includes a base having an inlet and an outlet. The base defines an interior cavity through which fluid is flowable from the inlet to the outlet. The apparatus also includes a valve that is movable relative to the base between a closed and open position. In the closed position, the valve is in sealing engagement with the base to prevent fluid flow through the inlet. In the open position, the valve allows fluid flow through the inlet. The apparatus further includes a removable sleeve that is removably securable about a portion of the base. The valve remains in the closed position as the removable sleeve is removed from and secured about the base.

In one implementation of the apparatus, the valve includes a plug that is configured to engage an inner surface of the interior cavity to prevent movement of the valve in an outwardly direction. The valve can include a biasing element that is configured to bias the valve in the closed position. In some implementations, the cross-sectional area of the interior cavity does not decrease in a direction extending from the inlet to the outlet.

According to certain implementations, the base can include a head portion and a nose portion. The nose portion can be nestably engageable with the removable sleeve. In some instances, the removable sleeve includes nozzle engaging elements that are configured to engage a fluid providing nozzle.

In some implementations, the apparatus further includes a fluid seal between the base and removable sleeve. The fluid seal can be an o-ring positioned about an exterior surface of the base proximate the inlet.

In certain implementations of the apparatus, the removable sleeve includes an inlet that is coextensive with the base inlet when the removable sleeve is removably secured to the base. The removable sleeve can be removably secured to the base via a threaded engagement.

According to another embodiment, a fuel receiver for receiving fuel from a nozzle, where the fuel receiver is communicable in fuel providing communication with a fuel tank of a vehicle, includes base securable to a vehicle. The base defines an interior space. The fuel receiver also includes a poppet positioned within the interior space. The poppet is engageable with the nozzle to allow fuel to flow into the interior space and the fuel tank of the vehicle. The base and poppet define a fuel flow channel therebetween. The fuel receiver further includes a sleeve removably secured to the base and positioned about an exterior of the base. The sleeve is configured to receive and removably retain the nozzle.

In some implementations of the fuel receiver, the base includes a vehicle attachment portion, a nose portion, and a head portion intermediate the vehicle attachment portion and nose portion. The sleeve can be configured to substantially cover the nose portion of the base. The base can also include a plurality of external threads and the sleeve can include a plurality of internal threads. In certain implementations, threaded engagement between the external threads and internal threads removably secures the sleeve to the base.

According to some implementations of the fuel receiver, the poppet includes a first spring channel. The fuel receiver can also include a spring where a portion of the spring is positioned within the first spring channel. The spring can bias the poppet into engagement with the base to prevent fuel flow into the fuel flow channel. The fuel receiver may also include a valve guide coupled to the base. The valve guide can include a second spring channel with a portion of the spring being positioned within the second spring channel. A portion of the valve guide can be positioned within the first spring channel of the poppet.

In certain implementations, the cross-sectional area of the fuel flow channel either remains substantially constant or increases along substantially the entire length of the base in a fuel flow direction.

According to yet another embodiment, a method for receiving fluid from a fluid source includes providing a fluid receiver comprising a base defining an interior cavity and a valve positioned within the interior cavity. The valve is biased in sealed engagement with the base. The method can also include removably securing a sleeve about the base. The valve remains in sealed engagement with the base as the sleeve is removably secured to the base. Additionally, the method includes coupling a nozzle to the sleeve and actuating the nozzle to move the valve out of sealed engagement with the base. Further, the method includes directing a fluid into the interior cavity via the nozzle when the valve is out of sealed engagement with the base.

In some implementations of the method, the sleeve includes an external surface having nozzle engaging elements and the nozzle includes sleeve engaging elements corresponding with the nozzle engaging elements. In such implementations, coupling the nozzle to the sleeve can include engaging the sleeve engaging elements with the nozzle engaging elements.

According to certain implementations, the method includes removing the sleeve from the base. Moreover, the valve remains in sealed engagement with the base as the sleeve is removed from the base. Removably securing the sleeve about the base and removing the sleeve from the base can include rotating the sleeve relative to the base.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

The subject matter of the present application has been developed in response to the present state of the art, and in particular, in response to the problems and needs in the art that have not yet been fully solved by currently available fuel receivers. Accordingly, the subject matter of the present application has been developed to provide a fluid receiver that overcomes at least some shortcomings of the prior art.

Described herein are various embodiments of a fluid receiver with a removable sleeve. Generally, the removable sleeve can be removed and replaced without removing the receiver. In specific embodiments, the fluid receiver is a fuel receiver secured to a motorized vehicle in fluid communication with a fuel tank of the vehicle. Moreover, the fuel receiver is detachably coupleable to a fuel nozzle of a fuel hose in fuel supplying communication with a fuel source to refuel the vehicle. As an outer surface of the sleeve is worn down from repeated refueling events, the sleeve is damaged, or removal of the sleeve is otherwise desired, the sleeve can be decoupled from the fuel receiver without removing the receiver from the vehicle. Moreover, in certain instances, the fuel receiver is configured to promote ease in manufacturing, reduce manufacturing costs, and save fuel by minimizing fuel leakage during refueling.

Figure 1:
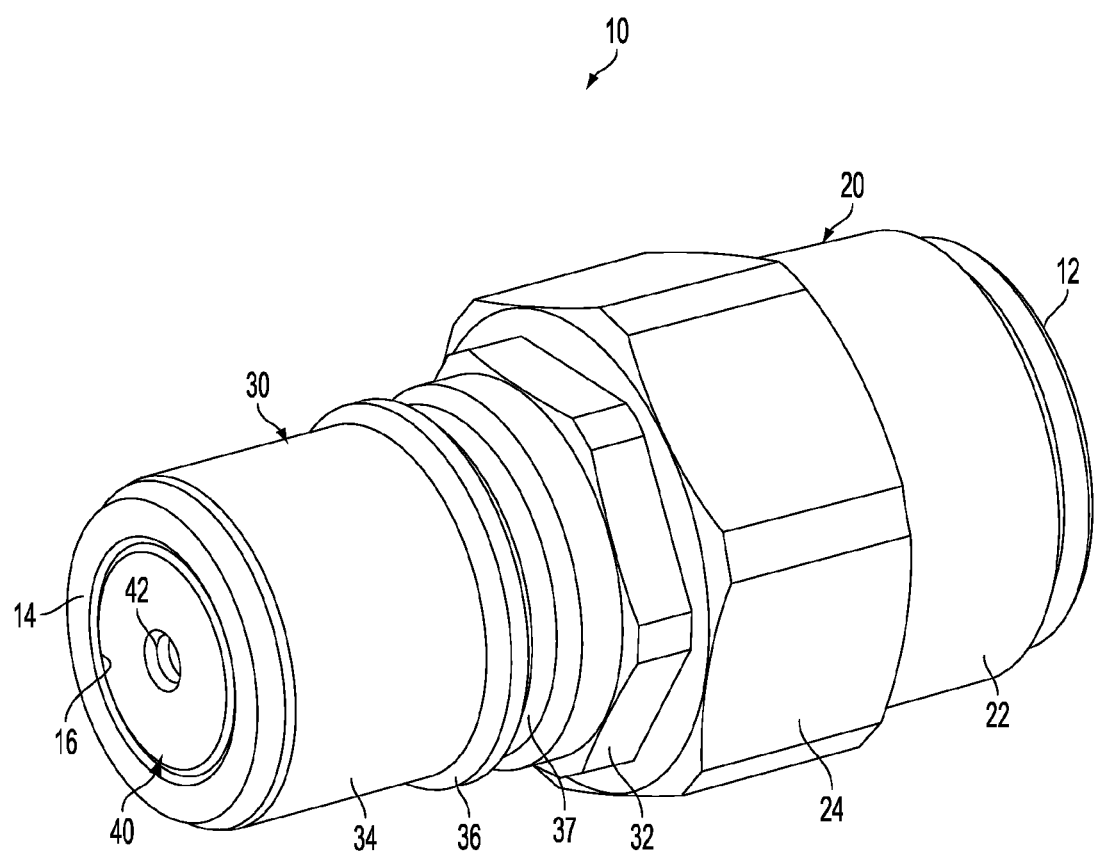
FIG. 1 is an anterior perspective view of a fluid receiver according to one representative embodiment.
Figure 2:
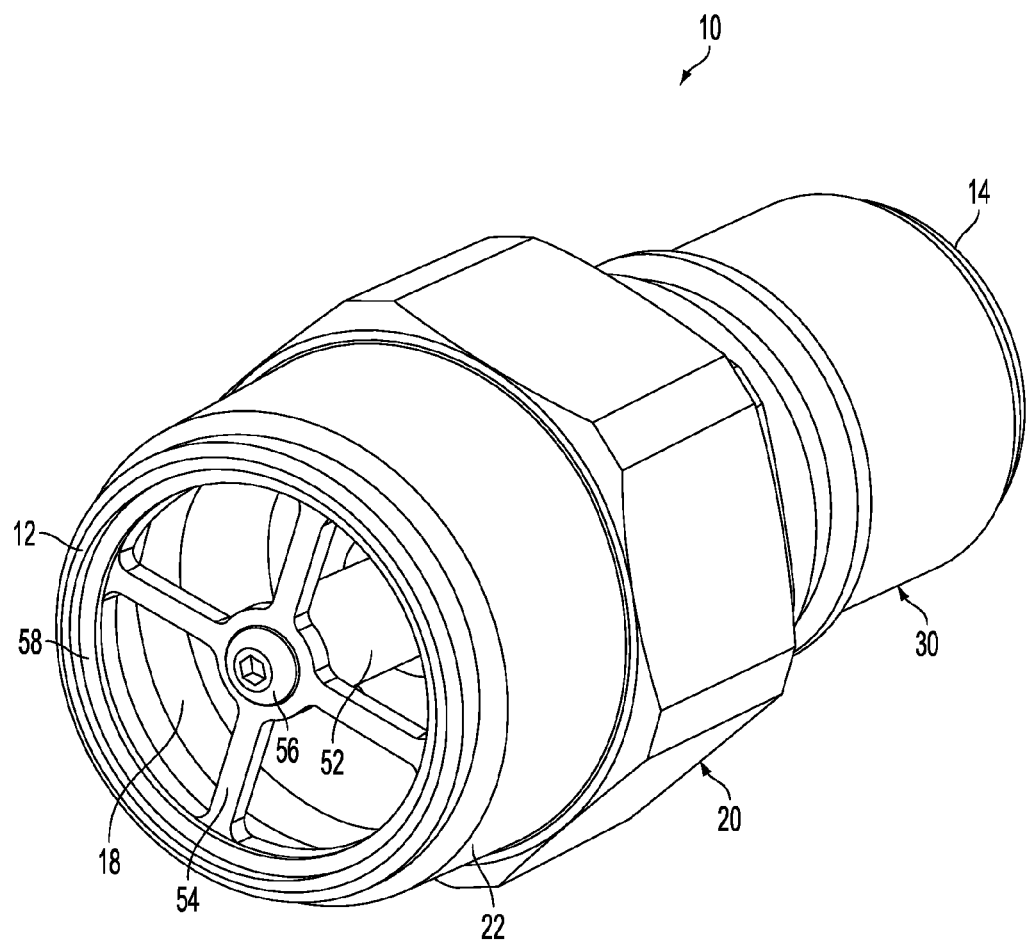
FIG. 2 is a posterior perspective view of the fluid receiver of FIG. 1.
Figure 3:
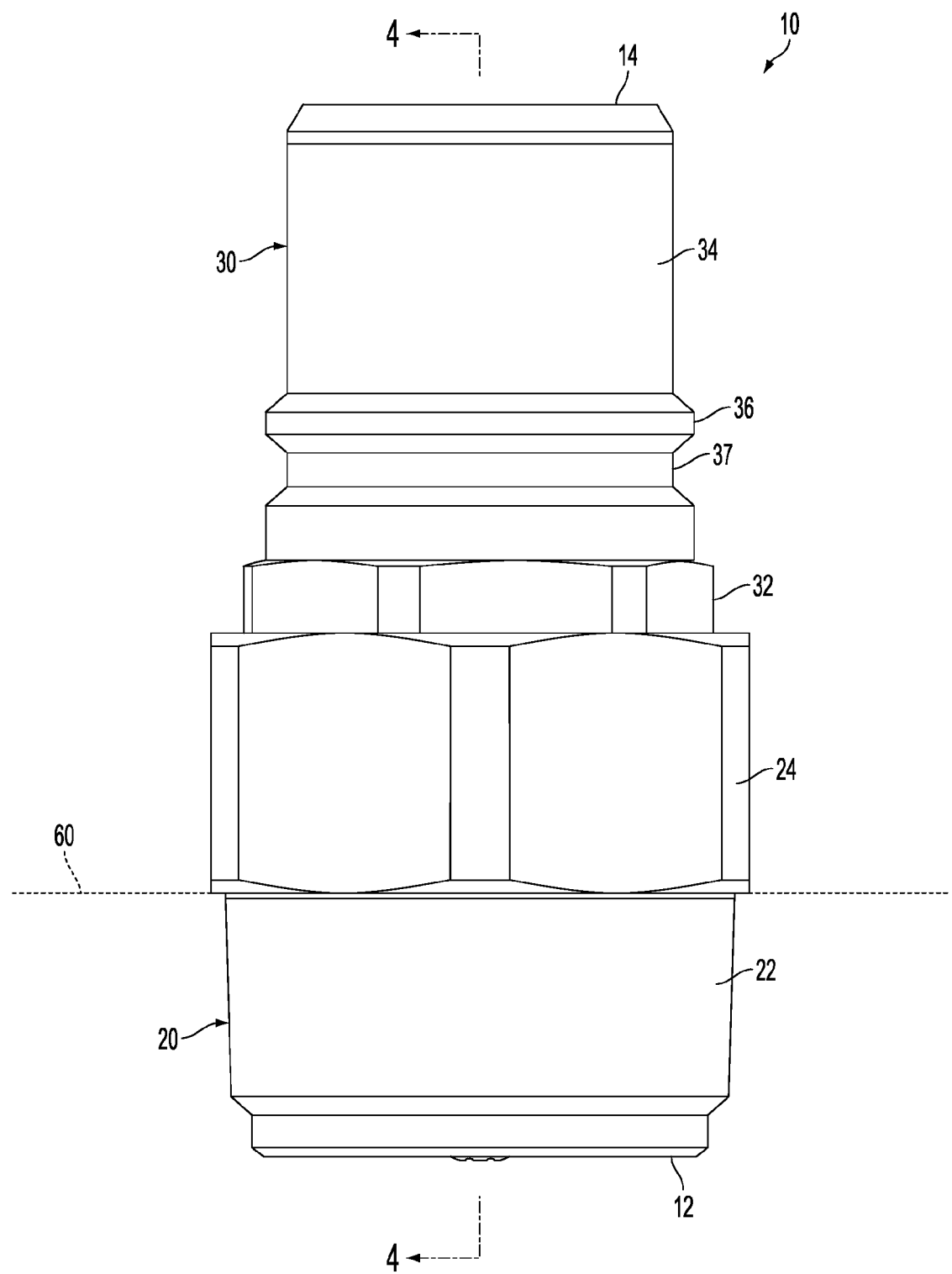
FIG. 3 is a side elevation view of the fluid receiver of FIG. 1.

Referring to FIG. 1, and according to one illustrative embodiment, a fuel receiver 10 includes a base 20 and a removable sleeve 30 removably coupleable to the base. The fuel receiver 10 extends from a first inner end 12 to a second outer end 14. Generally, the fuel receiver 10 is secured to a motorized vehicle 60 (see FIG. 3) such that the first inner end 12 is in fluid communication with a fuel tank (not shown) and the second outer end 14 extends away from the vehicle to be accessible at a location external to the vehicle. The fuel receiver 10 also includes a fuel inlet 16 proximate the second outer end 14 and a fuel outlet 18 proximate the first inner end 12 (see FIG. 2).

The base 20 includes a vehicle attachment portion 22 and a head portion 24. Although not shown, the vehicle attachment portion 22 includes external threads configured to mate with internal threads formed in the vehicle 60. Although the head portion 24 is shown as having a generally hexagonal shape for receiving commonly available tools, such as wrenches or hexagonally-shaped sockets, the head portion 24 can have any of various shapes for receiving any of various tightening and loosing tools. The base 20 is secured to the vehicle 60 by threadably engaging the external threads of the vehicle attachment portion 22 with the internal threads of the vehicle and tightening the head portion 24 against the vehicle by rotating the base relative to the vehicle using a tool in mating engagement with the head portion 24.

Figure 4:
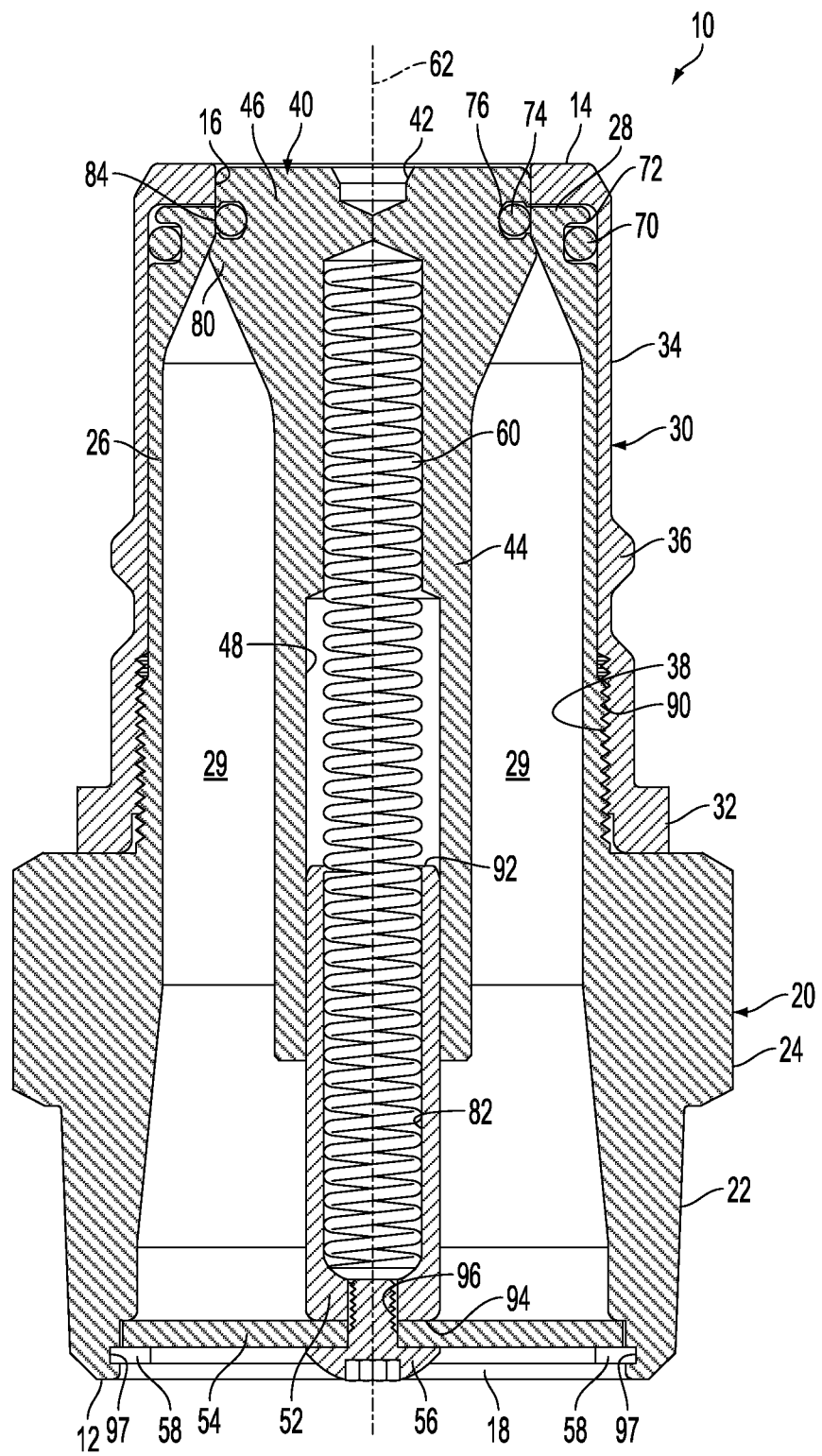
FIG. 4 is a side cross-sectional view of the fluid receiver of FIG. 1 taken along the line 4-4 of FIG. 3 shown in a closed position.

Referring to FIG. 4, the base 20 includes a nose portion 26 extending from the head portion 24 to an outer end portion 28. The outer end portion 28 defines a base inlet 88 (see FIG. 5) and includes an annular channel 72 formed in an outwardly facing surface of the end portion. The annular channel 72 is sized and shaped to receive a first O-ring 70. The nose portion 26 also includes a set of external threads 90 formed in the outwardly facing surface of the nose portion at a location between the annular channel 72 and head portion 24, e.g., proximate the head portion 24.

An inwardly facing surface of the base 20 defines an interior channel 29 through which fuel flows during a refueling event. The interior channel 29 extends from the outlet 18 to the base inlet 88. Extending from the base inlet 88 toward the outlet 18, the interior channel 29 includes a first straight section 84 and a diverging section 86 extending from the first straight section 84 (see, e.g., FIG. 5). In the illustrated embodiment, the first straight section 84 has a first diameter approximately equal to a diameter of the base inlet 88 and the diameter of the diverging section 86 increases in a direction away from the straight section 84 toward the outlet 18. Moreover, as illustrated, the interior channel 29 does not converge in a direction extending from the base inlet 88 to the outlet 18. Therefore, the interior channel 29 does not include protrusions or converging portions that might impede fuel flow and cause backpressure.

Referring back to FIG. 1, the fuel receiver 10 includes a valve, e.g., poppet 40, movably coupled to the base 20. The poppet 40 includes a nozzle guide 42 for receiving a portion of an actuating device, e.g., an opposing poppet, of a nozzle and maintaining proper alignment between the poppet 40 and the actuating device of the nozzle. Now referring to FIGS. 2 and 4, the poppet 40 is coupled to the base 20 via a valve guide 52, a spring 60, and engagement between a stop 80 on the poppet and the inwardly facing surface defining the diverging section 86 of the interior channel 29.

As shown in FIG. 4, the valve guide 52 is a generally tubular shaped element extending substantially perpendicularly from the outlet 18 toward the inlet 16. The valve guide 52 defines a channel 82 for receiving the spring 60 that extends from a free end 92 of the valve guide 52 to a location proximate a fixed end 94. The valve guide 52 is held in place by a valve guide support 54 secured to the base 20 and a fastener 56 (see, e.g., FIGS. 2 and 4). The fastener 56 extends through the valve guide support 54 and threadably engages an internally threaded aperture 96 of the valve guide 52. The valve guide support 54 is secured to the base 20 by a snap ring 58 engaged with a channel 97 formed in the base 20. In this manner, the valve guide 52 is fixed relative to the base 20 and axially aligned with a central axis 62 of the receiver 10.

Referring again to FIG. 4, the poppet 40 includes a stem 44 extending away from a plug 46. The stem 44 defines an interior channel 48. In the illustrated embodiment, the interior channel 48 includes an outer portion 98 having a diameter just larger than an outer diameter of the spring 60 and an inner portion 100 having a diameter just larger than an outer diameter of the valve guide 52 (see FIG. 5). In this manner, the outer portion 98 of the interior channel 48 is configured to matingly receive the spring 60 and the inner portion 100 is configured to matingly receive the valve guide 52. In the illustrated embodiment, the outer diameter of the stem 44 remains substantially constant along the length of the stem.

Figure 6:
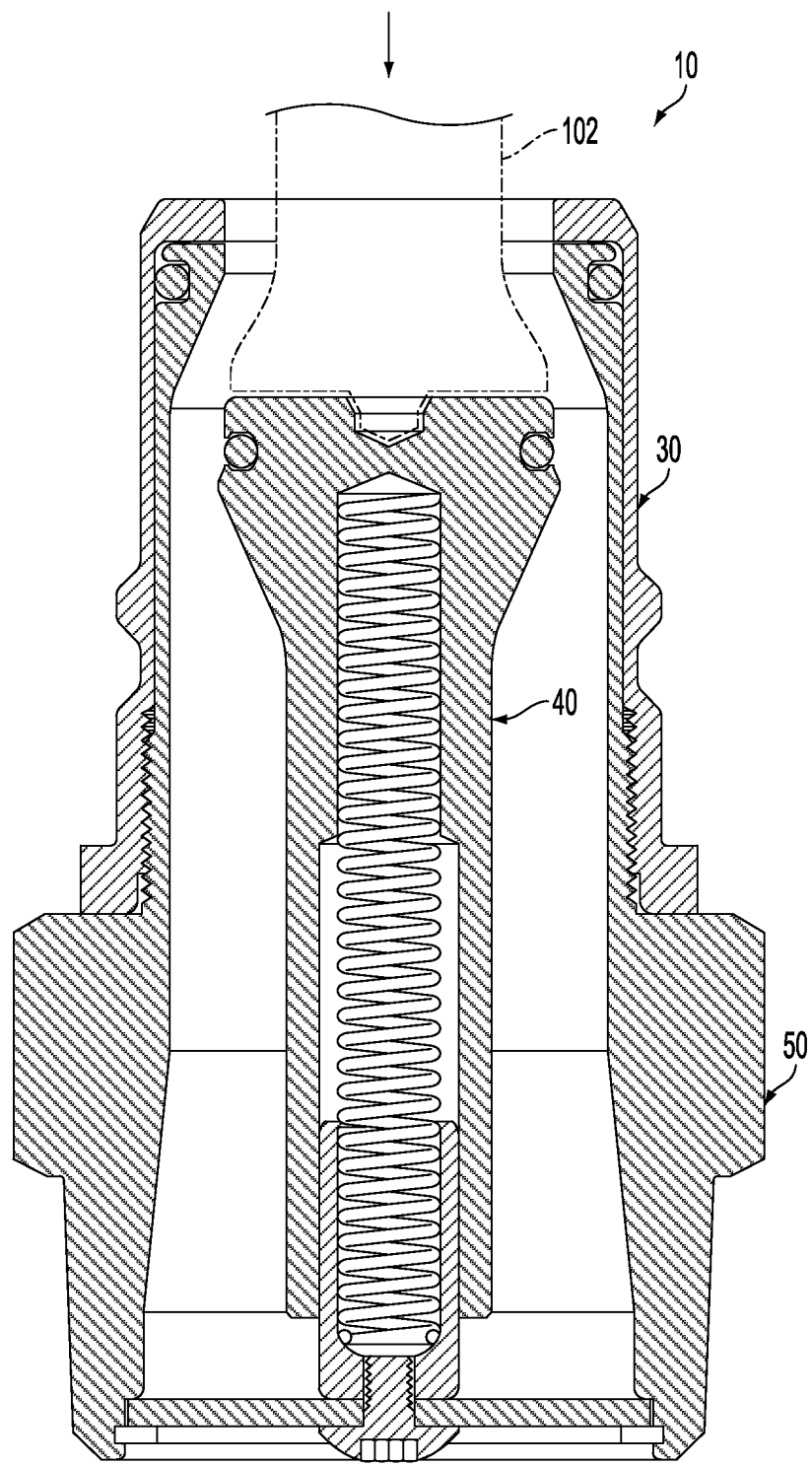
FIG. 6 is a side cross-sectional view of the fluid receiver of FIG. 1 taken along the line 4-4 of FIG. 3 shown in an open position.

The plug 46 is positionable proximate the base inlet 88 to seal the inlet 88 for preventing fuel and contaminants from entering the receiver and fuel tank, and preventing fuel from exiting the fuel tank through the receiver. To seal the base inlet 88 of the receiver 10, the plug 46 includes the stop 80 and an O-ring 74. The stop 80 is a generally annularly-shaped ridge having an outer diameter greater than the diameter of the first straight section 84. Because the diameter of the stop 80 is greater than that of the first straight section 84, the plug 46, and thus the poppet 40, is prevented from traveling outwardly through the base inlet 88. More specifically, as discussed above, as the plug 46 moves outwardly from an open position of the receiver 10 (see, e.g., FIG. 6) toward a closed position of the receiver 10 (see, e.g., FIG. 4), the stop 80 contacts the second diverging section 86 of the interior channel 29 and prevents further outward movement.

The O-ring 74 is seated within a channel 76 formed in the plug 46. As the plug 46 moves outwardly from the open position toward the closed position, the O-ring 74 contacts and forms a seal with the first straight section 84 of the interior channel. The seal between the O-ring 74 and the first straight section 84 prevents fuel from passing between the plug 46 and the nose portion 26 of the base 20. As defined herein, the receiver 10 is in the closed position when the stop 80 is in contact with the surface defining the diverging section 86 and the O-ring 74 is sealingly engaged with the straight section 84. Conversely, the receiver 10 is in the open position when the stop 80 is out of contact with the diverging section 86, the O-ring 74 is out of sealed engagement with the straight section 84, and a space between the plug and nose portion 26 is defined to facilitate fuel flow into the interior channel 29.

In contrast to some conventional fuel receivers, the receiver 10 includes a single poppet 40 with a single plug 46. In other words, the receiver 10 does not include an additional poppet with a plug or a check valve positioned inwardly of the poppet 40. Because the stem 44 does not increase in diameter along its length and the receiver 10 does not include a second plug or check valve assembly positioned within the interior channel 29 intermediate the plug 46 and the outlet 18, as with other conventional receivers, fluid is allow to flow through the receiver in a relatively straight and uniform manner. In other words, the configuration of the receiver 10 facilitates a reduction in the turbulence within the fuel flow compared to conventional receivers, which results in a reduction in the back pressure induced by the receiver compared to conventional receivers.

Because backpressure inhibits flow through the receiver 10, the lower the backpressure, the higher the fuel flow through the receiver for a given fuel pressure in the fuel hose supplying the fuel. Therefore, the receiver 10 promotes higher fluid flow rates for a given fuel pressure than conventional receivers. For example, the fuel receiver 10 of the illustrated embodiment can achieve an approximately 20% greater flow rate than conventional receivers having a dual poppet assembly and an approximately 40% greater flow rate than conventional receivers having a poppet and check valve configuration. Accordingly, a smaller fuel pump or a fuel pump operating at a lower psi can be used to pump fuel through the fuel receiver 10 compared with conventional fuel receivers. Because a smaller pump or lower psi can be used with the fuel receiver 10, the energy and cost to pump fuel through the fuel receiver 10 can be less than conventional fuel receivers for the same fuel flow rate.

When assembled, the spring 60 is positioned within the interior channel 48 of the stem 44 and the interior channel 82 of the valve guide 52. The valve guide 52 maintains axial alignment of the poppet 40 with the base during actuation of the poppet. Referring to FIG. 4, the bias of the spring 60 urges the poppet 40 in an outward direction, i.e., a direction extending from the outlet 18 to the inlet 16, to place the receiver in the closed position. The spring 60 has a predetermined bias corresponding to a desired amount of backpressure generated by the receiver 10. Generally, the lower the bias the less the backpressure and vice versa. During the refueling process, an opposing poppet or plunger 102 of a fueling nozzle contacts the poppet 40 and applies an inwardly directed force (i.e., a force directed in a direction opposite outward direction) onto the poppet 40. When the force generated by the poppet 102 is greater than the biasing force of the spring 60, the poppet 40 moves inwardly such that the seal between the O-ring 74 and nose portion 26 is broken and fuel is allowed to flow through the base inlet 88 between the poppet 40 and the nose portion. The poppet 40 can be further moved away from the base inlet 88 into a more open position to create a substantial space through which fuel can flow (see FIG. 6).

Referring back to FIG. 1, the removable sleeve 30 includes a head portion 32 and a nozzle guide portion 34. Like the head portion 24, the head portion 32 is shown having a generally hexagonal shape for receiving commonly available tools, such as wrenches or hexagonally-shaped sockets. However, in other embodiments, the head portion 32 can have any of various shapes for receiving any of various tightening and loosing tools. The nozzle guide portion 34 is configured to initially receive and properly align the nozzle of a fueling hose.

The removable sleeve 30 also includes an annular ridge 36 extending about a circumference of the sleeve and positioned between the head portion 32 and nozzle guide portion 34. Further, the removable sleeve 30 includes an annular groove 37 extending about a circumference of the sleeve and positioned adjacent the annular ridge 36 between the annular ridge and the head portion 32. The annular ridge 36 and annular groove 37 are configured to mate with corresponding elements of a nozzle. More specifically, the annular ridge 36 mates with a sealing element, e.g., a wiper seal, of the nozzle to create a seal between the wiper seal and the annular ridge 36. The annular groove 37 mates with a ring of ball bearings of the nozzle to securely couple the nozzle to the receiver 10. As shown, the annular ridge 36 and annular groove 37 are tapered to facilitate the sliding of the ball bearings up over the annular ridge and into the annular groove 37.

Figure 5:
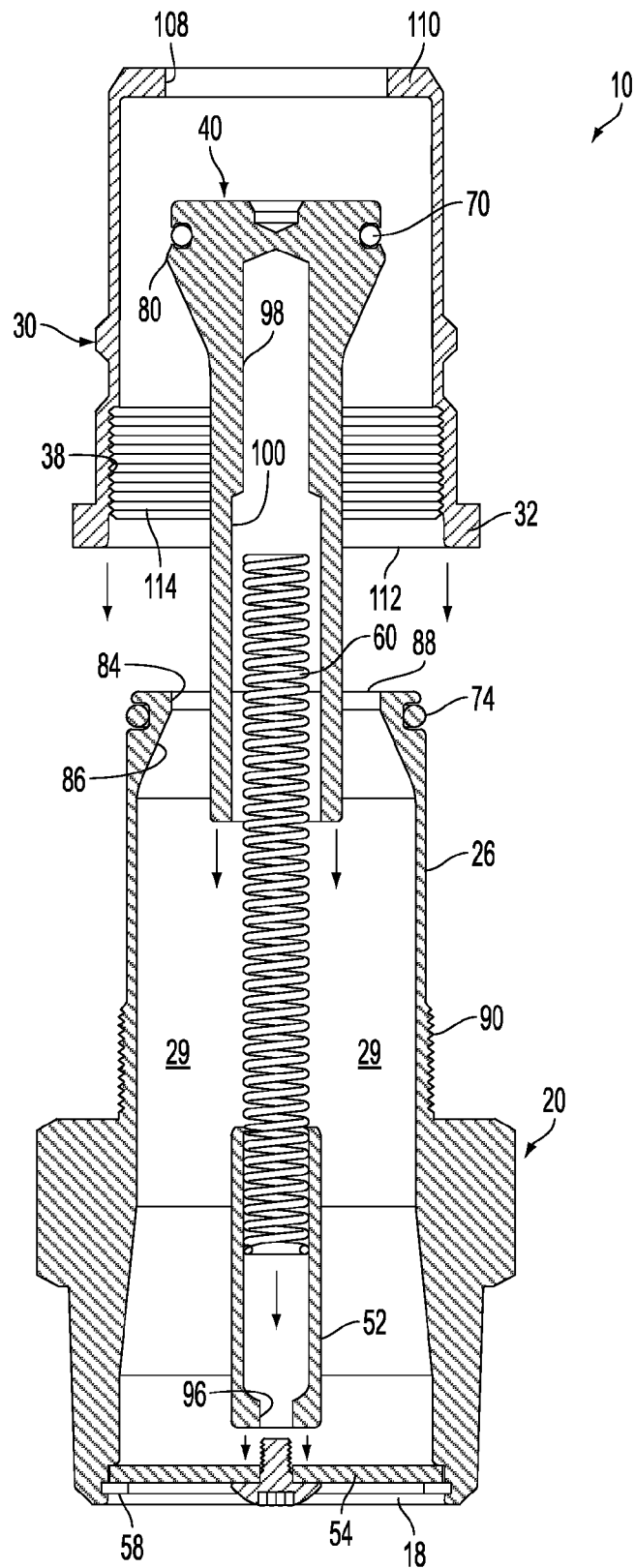
FIG. 5 is a side cross-sectional exploded view of the fluid receiver of FIG. 1 also taken along the line 4-4 of FIG. 3.

Referring to FIG. 5, the removable sleeve 30 includes a sleeve inlet 108 at an outer end 110 of the sleeve and an open inner end 112 opposite the outer end 110. The open inner end 112 is configured to receive the nose portion 26 of the base 20 during assembly of the receiver 10, or as will be described below, a replacement sleeve 30 is secured to the base. The interior surface of the sleeve 30 defines an interior cavity 114. The sleeve 30 also includes internal threads 38 formed in the interior surface of the sleeve proximate the open inner end 112. The internal threads 38 of the sleeve 30 are configured to threadably engage the external threads 90 of the base 20.

The removable sleeve 30 is positionable at least partially about (e.g., envelopes) the nose portion 26 such that the nose portion is positioned (e.g., nestably engaged) within the interior cavity 114. The removable sleeve 30 is then removably secured to the base 20 by threadably engaging the internal threads 38 of the sleeve with the external threads 90 of the base and tightening the head portion 32 against the base 20 (e.g., the head portion 24 of the base) by rotating the sleeve relative to the base in a tightening direction using a tool in mating engagement with the head portion 32 (see FIG. 4). As used herein, a removable sleeve is a sleeve that can be easily removed, decoupled, or separated from the base without deforming or damaging the sleeve, base, or other components.

The interior cavity 114 of the sleeve is sized such that when removably secured to the base 20, the exterior surface of the nose portion 26 is matingly engaged with the interior surface of the sleeve such that the nose portion is nestably engaged with the sleeve. For example, the maximum outer diameter of the nose portion 26 is substantially the same as the minimum inner diameter of the interior cavity 114 of the sleeve 30. In some implementations, the distance between the exterior surface of the nose portion 26 and interior surface of the sleeve 30 is less than approximately 0.006 inches. Additionally, when removably secured to the base 20, the interior surface of the removable sleeve 30 is in sealing engagement with the O-ring 70 to prevent fluid and contaminants from passing between the sleeve and the nose portion 26 of the base 20. Referring to FIG. 4, the base inlet 88 and sleeve inlet 108 cooperatively form the inlet 16 of the receiver 10 when the sleeve 30 is removably secured to the base 20. In this manner, the base inlet 88 and sleeve inlet 108 are coextensive.

Figure 7:
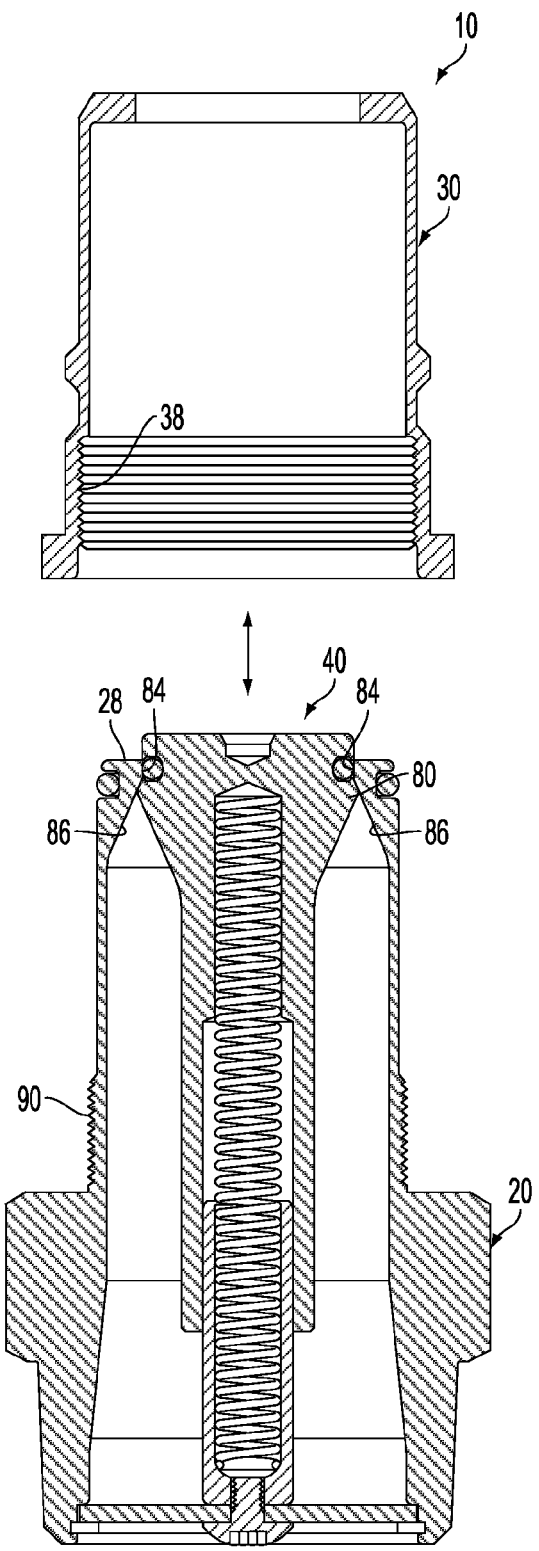
FIG. 7 is a side cross-sectional view of the fluid receiver of FIG. 1 taken along the line 4-4 of FIG. 3 and shown with a removable sleeve removed from the receiver.

Referring to FIG. 7, the removable sleeve 30 can be removed from the base 20 without removal of the base 20 or reconfiguration of the components within the base. For example, a sleeve 30 removably secured to the base 20 can be removed by rotating the sleeve relative to the base in a loosening direction opposite the tightening direction using a tool in mating engagement with the head portion 32. A decision to remove a sleeve can be determined by a visual inspection or whether a predetermined period of time has elapsed since the sleeve was last changed. If the removably secured sleeve 30 is worn or defective, the sleeve 30 can be removed and a replacement sleeve 30 can be removably secured to the base 20 in place of the removed sleeve. Alternatively, if the removably secured sleeve 30 requires repair or modification, the sleeve 30 can be removed, repaired or modified, and re-secured to the base 20.

Regardless of the motive behind removal of a removably secured sleeve 30, removal of the sleeve (and coupling of a new sleeve) is independent from the sealing operation of the poppet 40 relative to the base 20. In other words, removal of the sleeve 30 does not cause the poppet 40 to move and thus the seal between the O-ring 76 and the base 20 is unaffected during a sleeve removal and attachment process. Therefore, one can replace the sleeve 30 without removing the receiver 10 from a vehicle and without affecting the seal between the poppet 40 and the base 20. Because the seal between the poppet 40 and base 20 remains intact, fuel within the interior channel 29 of the base 20 is maintained within the interior channel (e.g., the fuel is prevented from leaking out of the receiver 10) during removal of one removable sleeve 30 from the receiver, the securing of a replacement sleeve to the receiver, and any time in between.

The various components of the fuel receiver 10, with the exception of at least the O-rings 70, 74, are made of a rigid and durable material. For example, in one implementation, the base 20 and poppet 40 are made of aluminum and the removable sleeve 30, spring 60, and valve guide 52 are made of steel. Generally, the exterior surface of the receiver in contact with the nozzle and associated attachment mechanisms of the nozzle must be a durable material, such as steel, to withstand continuous attachment and detachment of the nozzle. With conventional receivers, the portion of the receiver in contact with the nozzle is the nose portion of the base. Therefore, either the entire base or the entire nose portion of conventional receivers must be made of a harder and more durable material, such as steel. However, the base 20 of the fuel receiver 10 can be made of a less expensive and less durable material, such as aluminum, because the base 20 is not in contact with the nozzle.

Moreover, because the removable sleeve 30 is supported by the nose portion 26 of the base 20 and is used mainly as a contact surface for receiving the nozzle, the sleeve can be less bulky and more simply shaped than the noses of conventional receivers. Therefore, for a given material, the cost of manufacturing and materials associated with making the removable sleeve 30 is less than the cost of manufacturing and materials associated with making the noses of conventional receivers. Stated differently, due to the size and simplicity of the removable sleeve 30, it can be made of stronger, more durable, and more expensive material for about the same or less cost as conventional noses made of weaker material. For example, manufacturers of conventional fuel receivers do not make the base or nose portions out of some materials, such as 303 stainless steel, because of cost restrictions. However, the removable sleeve 30 can be made of stronger materials, such as 303 stainless steel, because the sleeve is easier and cheaper to manufacture than a base or nose portion. Therefore, in some implementations, the removable sleeve 30 resists wear and damage (e.g., has a longer operational life) than noses of conventional fuel receivers for about the same cost.

Although the illustrated embodiment has been described as being a fuel receiver, in other embodiments, the receiver 10 can be used to facilitate the secure transfer of any of various types of fluids from one location to another location.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Furthermore, the details, including the features, structures, or characteristics, of the subject matter described herein may be combined in any suitable manner in one or more embodiments. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for receiving a fluid from a fluid source via a fluid providing nozzle, comprising:

a base having an inlet and an outlet, the base defining an interior cavity through which fluid is flowable from the inlet to the outlet;
a valve movable relative to the base between a closed position in sealing engagement with the base to prevent fluid flow through the inlet and an open position allowing fluid flow through the inlet; and
a removable sleeve removably securable about a portion of the base, wherein the removable sleeve comprises a nozzle engaging element formed in an external surface of the removable sleeve, the removable sleeve being configured to receive a fluid providing nozzle over the external surface of the removable sleeve, and wherein the nozzle engaging element of the removable sleeve mates with a corresponding element of the fluid providing nozzle to securely retain the fluid providing nozzle on the removable sleeve;
wherein the valve remains in the closed position as the removable sleeve is removed from and secured about the base.

2. The apparatus of claim 1, wherein the valve comprises a plug configured to engage an inner surface of the interior cavity to prevent movement of the valve in an outwardly direction.

3. The apparatus of claim 1, wherein the valve comprises a biasing element configured to bias the valve in the closed position.

4. The apparatus of claim 1, wherein in a direction extending from the inlet to the outlet, the cross-sectional area of the interior cavity does not decrease.

5. The apparatus of claim 1, wherein the base comprises a head portion and a nose portion, the nose portion being nestably engageable with the removable sleeve.

6. The apparatus of claim 1, wherein the nozzle engaging element comprises an external groove that mates with a ring of ball bearings of the fluid providing nozzle to securely retain the fluid providing nozzle on the removable sleeve.

7. The apparatus of claim 1, further comprising a fluid seal between the base and removable sleeve.

8. The apparatus of claim 7, wherein the fluid seal comprises an o-ring positioned about an exterior surface of the base proximate the inlet.

9. The apparatus of claim 1, wherein the removable sleeve comprises an inlet, the sleeve inlet being coextensive with the base inlet when the removable sleeve is removably secured to the base.

10. The apparatus of claim 1, wherein the removable sleeve is removably secured to the base via a threaded engagement.

11. An apparatus for receiving a fluid from a fluid source, comprising:
a base having an inlet and an outlet, the base defining an interior cavity through which fluid is flowable from the inlet to the outlet;
a valve movable relative to the base between a closed position in sealing engagement with the base to prevent fluid flow through the inlet and an open position allowing fluid flow through the inlet, the valve comprising a first spring channel;
a spring having a portion positioned within the first spring channel, wherein the spring biases the valve in the closed position; and
a valve guide coupled to the base, the valve guide comprising a second spring channel with a portion of the spring being positioned within the second spring channel, wherein a portion of the valve guide is positioned within the first spring channel of the valve.

12. The apparatus of claim 11, further comprising a removable sleeve removably securable about a portion of the base.

13. The apparatus of claim 12, wherein the valve remains in the closed position as the removable sleeve is removed from and secured about the base.

14. The apparatus of claim 11, wherein the valve comprises a plug configured to engage an inner surface of the interior cavity to prevent movement of the valve in an outwardly direction.

15. The apparatus of claim 11, wherein in a direction extending from the inlet to the outlet, the cross-sectional area of the interior cavity does not decrease.

16. An apparatus for receiving a fluid from a fluid source, comprising:
a base having an inlet and an outlet, the base defining an interior cavity through which fluid is flowable from the inlet to the outlet;
a valve movable relative to the base between a closed position in sealing engagement with the base to prevent fluid flow through the inlet and an open position allowing fluid flow through the inlet;
a biasing element configured to bias the valve in the closed position; and
a removable sleeve removably securable about a portion of the base, wherein the removable sleeve is made from a non-deformable, rigid material and wherein the removable sleeve comprises a nozzle engaging element formed in an external surface of the removable sleeve, the removable sleeve being configured to receive a fluid providing nozzle over the external surface of the removable sleeve, and wherein the nozzle engaging element of the removable sleeve mates with a corresponding element of the fluid providing nozzle to securely retain the fluid providing nozzle on the removable sleeve;
wherein the valve remains biased in the closed position by the biasing element as the removable sleeve is removed from and secured about the base.

17. The apparatus of claim 16, wherein the base comprises a plurality of external threads and the removable sleeve comprises a plurality of internal threads, and wherein threaded engagement between the external threads and internal threads removably secures the sleeve to the base.

18. The apparatus of claim 16, wherein the base and valve define a fluid flow channel there between, and wherein in a fuel flow direction the cross-sectional area of the fuel flow channel either remains substantially constant or increases along substantially the entire length of the base.

19. The apparatus of claim 16, wherein the removable sleeve is made from a first metal and the base is made from a second metal, the first metal being different than the second metal.

20. The apparatus of claim 19, wherein the first metal is stronger and more durable than the second metal.

* * * * *